M. A. O'CONNOR.
DRAFT RIGGING.
APPLICATION FILED FEB. 4, 1909.

1,079,060.

Patented Nov. 18, 1913.

2 SHEETS—SHEET 1.

WITNESSES:
F. B. Townsend
H. W. Munday

INVENTOR
Martin A. O'Connor.
BY
Munday, Evarts, Adcock & Clarke
his ATTORNEYS

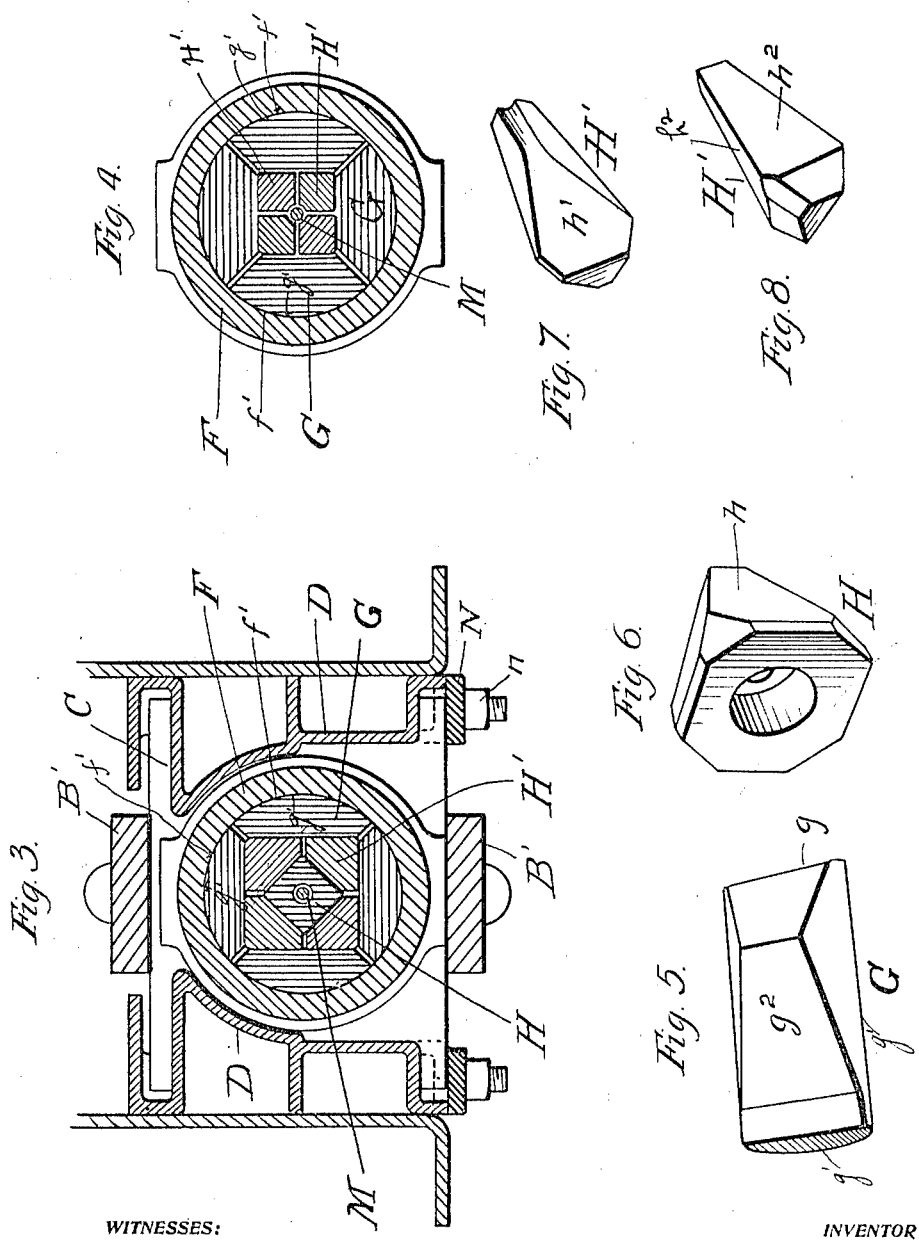

UNITED STATES PATENT OFFICE.

MARTIN A. O'CONNOR, OF BUFFALO, NEW YORK, ASSIGNOR TO W. H. MINER COMPANY, OF CHICAGO, ILLINOIS, A CORPORATION OF ILLINOIS.

DRAFT-RIGGING.

1,079,060.     Specification of Letters Patent.     Patented Nov. 18, 1913.

Application filed February 4, 1909. Serial No. 475,869.

*To all whom it may concern:*

Be it known that I, MARTIN A. O'CONNOR, a citizen of the United States, residing in the city of Buffalo, in the county of Erie and State of New York, have invented a new and useful Improvement in Draft-Rigging, of which the following is a specification.

My invention relates to friction draft rigging for railway cars.

The object of my invention is to provide a friction draft rigging, of a strong, simple, efficient and durable construction of high cushioning capacity, and which will at the same time have a perfect, certain and reliable release action, and avoid all danger of the friction devices sticking or failing to properly release.

My invention consists in the means I employ to practically accomplish this result. That is to say, it consists in connection with the coupler draw-bar, draft yoke, draft lugs or stop castings, followers, spring and coacting friction members, preferably a longitudinally movable friction shell or case and a plurality of longitudinally movable friction shoes within the case, and a coöperating compound wedge or spreader device comprising a blunt wedge member abutting against one of the followers to insure a perfect, certain and reliable release action, and prevent possibility of the friction devices sticking, and an acute wedge member having a plurality of collapsible segments, each having an acute wedge face engaging the corresponding acute wedge face of the friction shoe, and a blunt wedge face engaging the corresponding face of the blunt wedge member, the acute wedge member serving to give the draft rigging a very high cushioning capacity, owing to the small angle of the wedge faces thereof which engage with the friction shoes, without in any way interfering with the release movement.

The invention further consists in a blunt wedge member of pyramidal form, preferably four sided, in connection with a segmental or collapsible secondary wedge member comprising as many segments as there are sides to the blunt pyramidal wedge, and each segment furnished with a plurality of wedge faces engaging two adjacent friction shoes to wedge such shoes apart and multiply, compound or increase the pressure of the shoes against the surrounding friction shell.

My invention further consists in the novel construction of parts and devices, and in the novel combinations of parts and devices herein shown and described, and more particularly specified in the claims.

Figure 1:
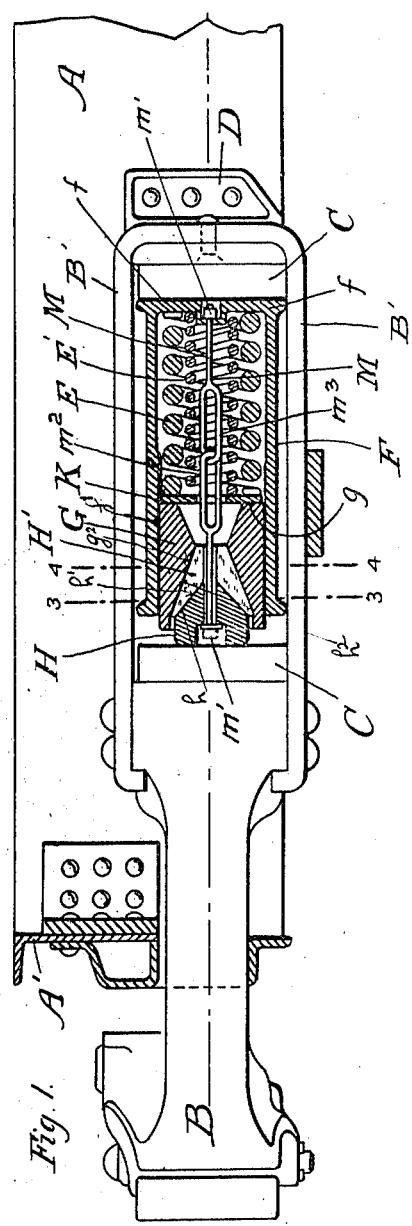
Figure 2:
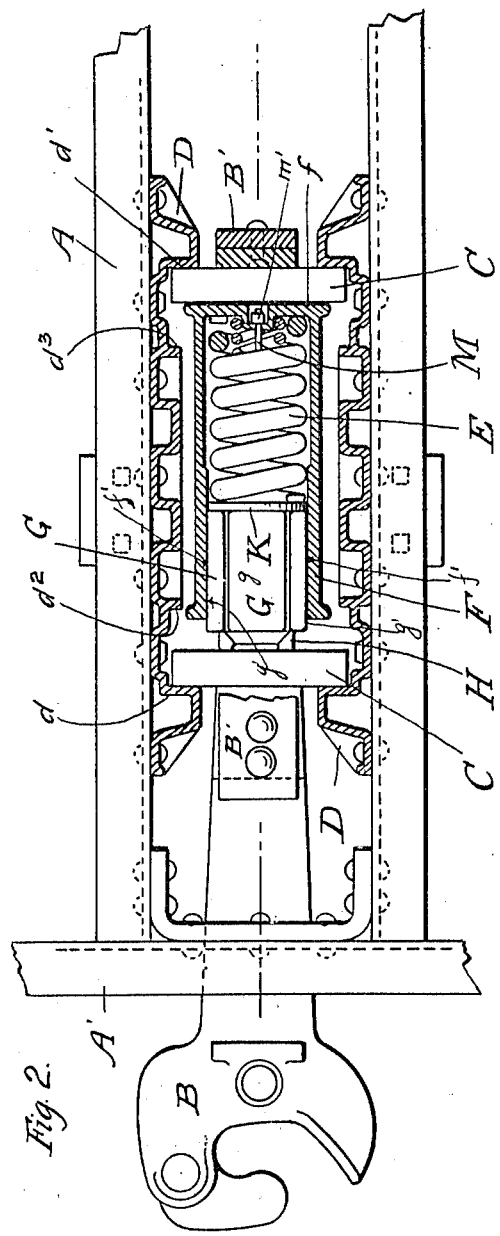

In the accompanying drawing forming a part of this specification, Figure 1 is a side elevation partly in central, vertical longitudinal section embodying my invention. Fig. 2 is a plan view partly in horizontal section. Fig. 3 is a cross section on line 3—3 of Fig. 1. Fig. 4 is a detail cross section of the friction shell on line 4—4 of Fig. 1. Fig. 5 is a detail perspective view of one of the friction shoes. Fig. 6 is a detail perspective view of the blunt pyramidal wedge member. Figs. 7 and 8 are detail perspective views of one of the segments of the acute wedge member.

In the drawing, A represents the center sills or other frame members of the car to which the draft rigging is applied, $A^1$ the front or end sill, B the coupler draw-bar, $B^1$ the draft yoke, C C front and rear followers, D the draft lug members or stop castings on the car frame against which the followers abut, and having front and rear shoulders $d$ $d^1$ and intermediate shoulders $d^2$ $d^3$, the latter to limit the movement of the followers, E $E^1$ the springs, the latter being a small spring within the larger one, F G coacting friction members, the former preferably a longitudinally movable shell or cylinder, and the latter consisting of a plurality of segmental friction shoes longitudinally movable within the friction shell, and H $H^1$ together constituting the compound wedge or spreader device. The spring E, or springs E $E^1$ if both are employed, are interposed between the friction members F G so that the expansion of the spring tends to separate the same; that is to say, the spring bears at one end against the head or end $f$ of the friction shell F, and at its opposite end against the rear end $g$ of the friction shoes G, a circular plate or disk K being interposed to give a smooth bearing. The friction member or shell F is preferably of cylindrical form in cross section, and has an inner cylindrical friction face $f^1$.

The longitudinally movable friction shoes

G each have an external friction face $g^1$ parallel to and in sliding frictional engagement with the internal friction face $f^1$ of the friction shell F. The segmental friction shoes G are preferably four in number, and each is furnished with an acute angle wedge face $g^2$ for engagement with the acute angle wedge faces of the compound wedge or spreader device H H$^1$ so that the friction shoes may be forced against the friction shell with the necessary heavy pressure required to produce the desired high cushioning capacity in the draft rigging.

The compound wedge or spreader device H H$^1$ comprises a blunt wedge member H against which the follower acts, and which is consequently free to recede the instant the pressure of the follower thereagainst is relieved in whole or in part by reason of the blunt or obtuse angle of its wedge faces $h$, and a segmental or collapsible acute wedge member H$^1$, the segments of which each have both a blunt or obtuse angle wedge face $h^1$ for engagement with the corresponding wedge faces $h$ of the blunt wedge member H, and also a sharp or acute angle wedge face $h^2$ for engagement with the corresponding sharp or acute angle wedge face of one of the segmental friction shoes G. Each of the segmental wedge members H$^1$ is preferably furnished with two acute wedge faces $h^2$ arranged at an angle to each other in cross section for engagement with two adjacent friction shoes G G. The segmental wedge members H$^1$ thus fit cornerwise between and engage each a plurality of the friction shoes, the segmental wedge members H$^1$ breaking joints with the friction shoes. The primary wedge member or buffer block H, against which the draw bar directly acts through the front follower, in like manner has its adjacent blunt wedge faces $h$, which intersect at an angle to each other, fitting cornerwise between and engaging two adjacent segmental secondary wedge members H$^1$.

The compound spreader device H H$^1$, comprising an inner or blunt wedge member H and an outer or secondary wedge member H$^1$ composed of a plurality of wedge segments each having in addition to its inner wedge face $h^1$ two outer divergent wedge faces $h^2$ $h^2$ acting to separate or wedge apart two adjacent friction shoes G G, multiplies, compounds or increases the pressure of the friction shoes G against the friction shell F in a two-fold manner: first, by reason of the sharper angle of the outer wedge faces $h^2$ which act upon the friction shoes G, and second, by reason of the fact that each outer wedge segment H$^1$ is arranged between two adjacent friction shoes G G, and thus acts as a second wedge to force the shoes apart and against the friction shell. The friction shoes G are thus forced against the friction shell F through the action of a main wedge H itself acting upon a secondary wedge H$^1$ which acts upon the friction shoes. And this pressure of the friction shoes against the friction shell is further increased by reason of the sharp angle which in my invention it is practicable to employ for the wedge faces $h^2$ $h^2$ of the secondary wedge segments H$^1$. In practising my invention, I prefer, as shown in the drawing, to compound or increase the pressure of the friction shoes against the friction shell by use of main and secondary wedge members, which act in this two-fold manner, of a wedge upon a wedge, and also by the sharper angle of the outer wedge faces of the secondary wedge member, thus employing both of these principles, instead of only one. The angle of the wedge faces of the blunt wedge member H is such in relation to the material of which the main and secondary wedge members are composed, as to entirely prevent sticking of the main or primary wedge member in the secondary wedge member, and to permit proper, certain and reliable release, and this is what I mean by a blunt wedge member. And by use of the term "acute" or "sharp" wedge members or wedge faces, I mean a wedge member or wedge face of a sharper angle than that employed for the blunt wedge member.

To hold all the coacting parts assembled in relation with each other and to enable the friction shell and all of its contained parts to be bodily removed when required for repair, renewal or replacement, I provide a connection M between the blunt or pyramidal wedge member H and the friction shell F, this connection preferably consisting of a rod furnished with screw threads $m$ and nuts $m^1$ at each end, and formed in two flexibly connected parts $m^2$ $m^3$, each part preferably having an integral loop or link member. The flexible construction of this connecting rod insures an equal bearing of the blunt wedge member H against the four segmental wedge devices H$^1$.

I prefer to make the head or end $f$ of the friction shell or cylinder F integral therewith instead of in a separate piece.

N represents the removable guide or carrier plate secured by bolts $n$ to the center sills or draft lug members.

In operation, when the pulling or buffing blow or movement of the draw-bar is being cushioned by the conjoint action of the cushioning spring or springs E E$^1$ and the coacting friction members F G, the conjoint wedge or spreader device H H$^1$ by engagement of its acute wedge faces $h^2$ with the acute wedge faces of the friction shoes, acts as a single solid wedge or spreader device with acute angle wedge faces, acting directly against the acute angle wedge faces of the friction shoes, and thus exerts a very powerful spreading pressure against such shoes and presses them with great force against the friction shell or member F, and thus causes a very high and powerful cushioning action, capable of receiving and properly cushioning the heaviest strains or blows of the draw-bar. The instant, however, the blow or strain of the draw-bar is relieved against the blunt member H of the compound wedge, it being entirely free to recede, permits the segmental or collapsible acute faced wedge member H¹ to collapse, recede, loosen or its segments to move slightly toward each other and thus relieve the previous forcible frictional engagement between the friction shoes G and friction shell F, thereby permitting and causing the springs, by their stored up energy, to effect a perfect, certain and reliable release movement of the friction devices and entirely preventing any possibility of the friction devices sticking.

I claim:—

1. In a friction draft rigging, the combination with the draw-bar, spring and coacting friction members, of a compound wedge having a blunt wedge member and a collapsible acute wedge member, the latter acting against the friction members to produce high cushioning capacity, and the former against the draw-bar to insure a perfect, certain and reliable release action, substantially as specified.

2. In a friction draft rigging, the combination with a draw-bar, spring and coacting friction members, said spring reacting at one end against one of said friction members and at the other end against the other of said friction members to separate them, of a compound spreader device comprising a blunt faced wedge member and an acute faced segmental wedge member engaging said blunt wedge member and also engaging the friction member, substantially as specified.

3. In a friction draft rigging, the combination with a draw-bar, spring and followers, of a longitudinally movable friction shell, a plurality of segmental friction shoes within said shell, said spring reacting at one end against the shoes and at the other end against the shell to separate them, said friction shoes having acute wedge faces, a blunt wedge member and a plurality of acute wedge members engaging said friction shoes and having blunt wedge faces engaging the wedge faces of said blunt wedge, substantially as specified.

4. In a friction draft rigging, the combination with a draw-bar, spring and followers, of a friction shell, a plurality of segmental friction shoes within the shell, each having an inner acute wedge face, a plurality of segmental wedge members, each having a plurality of external acute wedge faces, acting upon adjacent friction shoes, and an inner blunt wedge face, a pyramidal wedge having blunt wedge faces acting upon said segmental wedge members, said spring reacting at one end against the friction shell and at the other end thereof against said friction shoes, and means for holding said friction shell and said parts within it in assembled coacting relation with each other, substantially as specified.

5. In a friction draft rigging, the combination with a draw-bar, spring and followers, of a friction shell, a plurality of segmental friction shoes within the shell, each having an inner acute wedge face, a plurality of segmental wedge members, each having a plurality of external acute wedge faces, acting upon adjacent friction shoes, and an inner blunt wedge face, a pyramidal wedge having blunt wedge faces acting upon said segmental wedge members, said spring reacting at one end against the friction shell and at the other end thereof against said friction shoes and a flexible connecting rod extending between said pyramidal wedge and said friction shell to hold the parts in coacting relation with each other, substantially as specified.

6. In a friction draft rigging, the combination with a friction shell, of a spring, four segmental friction shoes within the shell, each having an inner sharp angle wedge face, four segmental wedge members each having two external sharp wedge faces at right angles to each other, and also an inner blunt wedge face, said segmental wedge members fitting cornerwise within and breaking joints with said segmental friction shoes, and a four sided pyramidal wedge having external blunt wedge faces engaging the inner blunt wedge faces of said segmental wedge members, substantially as specified.

7. In a friction draft rigging, the combination with the spring and coacting friction members, of a compound spreader device comprising a primary wedge member and a plurality of secondary wedge members acted upon by said primary wedge member and acting upon the friction members, each of said secondary wedge members fitting cornerwise between and acting to force apart two adjacent friction members, substantially as specified.

8. In a friction draft rigging, the combination with a spring, of a friction shell, a plurality of friction shoes having inner wedge faces, a plurality of secondary wedge members having wedge faces acting upon said friction shoes, each of said secondary wedge members fitting between and acting to force apart two adjacent friction shoes, and a primary wedge member acting upon said secondary wedge members, substantially as specified.

9. The combination with a friction shell, friction shoes and spring, of a compound spreader device having a main wedge and a plurality of secondary wedge member segments, each fitting cornerwise and acting transversely upon two adjacent friction shoes, by the compound action of which the friction shoes are forced against the friction shell, substantially as specified.

10. The combination with a friction shell, friction shoes and spring, of a compound spreader device having a main wedge and a plurality of secondary wedge member segments and coöperating to increase the power of the main wedge, said segments having angular outer wedge faces engaging and spreading apart two adjacent friction shoes, substantially as specified.

11. In a friction draft gear, the combination with the casing, of friction blocks, a buffing block, and interposed wedge blocks having outer faces engaging the inner faces of the friction blocks and inner faces of steeper inclination engaging the outer faces of the buffing block, substantially as set forth.

MARTIN A. O'CONNOR.

Witnesses:
EDMUND ADCOCK,
C. J. NASH.

Copies of this patent may be obtained for five cents each, by addressing the "Commissioner of Patents, Washington, D. C."